US008595754B2

(12) United States Patent
Van Doorn

(10) Patent No.: US 8,595,754 B2
(45) Date of Patent: Nov. 26, 2013

(54) DATA PROCESSING SYSTEM AND A METHOD OF OPERATING A RENDERING PLATFORM

(75) Inventor: Markus G. L. M. Van Doorn, 'S-Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 1428 days.

(21) Appl. No.: 12/064,826

(22) PCT Filed: Aug. 31, 2006

(86) PCT No.: PCT/IB2006/053027
§ 371 (c)(1),
(2), (4) Date: Feb. 26, 2008

(87) PCT Pub. No.: WO2007/026321
PCT Pub. Date: Mar. 8, 2007

(65) Prior Publication Data
US 2008/0244614 A1    Oct. 2, 2008

(30) Foreign Application Priority Data

Sep. 1, 2005 (EP) .................................. 05108027

(51) Int. Cl.
*G06F 15/163* (2006.01)
(52) U.S. Cl.
USPC ............................ 719/330; 719/313; 715/730
(58) Field of Classification Search
USPC ................................... 719/313, 330; 715/730
See application file for complete search history.

(56) References Cited

U.S. PATENT DOCUMENTS

| 2002/0169012 A1* | 11/2002 | Eves et al. ........................ 463/1 |
| 2003/0061400 A1* | 3/2003 | Eves et al. ..................... 709/321 |
| 2004/0056890 A1 | 3/2004 | Hao et al. |
| 2005/0097503 A1 | 5/2005 | Zintel et al. |

FOREIGN PATENT DOCUMENTS

WO    WO02092183 A1    11/2002

OTHER PUBLICATIONS

Hayes, S., "Microsoft Computer Dictionary", 5th Ed. (2002), p. 449.*
Brock, D.L., "The Physical Markup Language" (Feb. 2001) [retrieved from http://www.autoidlabs.org/uploads/media/MIT-AUTOID-WH-003.pdf on Nov. 17, 2011].*
Asa MacWilliams: "An AR Software Architecture: Dwarf" (Distributed Wearable Augmented Reality Framework) Institut fur Informatik, Technische Univeritat, Munchen, Germany, 28 Page Document, (Dec. 2001).
Reicher et al: "Results of a Study on Software Architectures for Augmented Reality Systems"; Proceedings of the Second IEEE and ACM International Symposium on Mixed and Augmented Reality (ISMAR 2003), 2 Page Document.
Reicher et al: "Towards a System of Patterns for Augmented Reality Systems"; Institut fur Informatik, Technische Univeritat Munchen, Germany, 6 Page Document, (2003).

(Continued)

*Primary Examiner* — H. S. Sough
*Assistant Examiner* — Brian Wathen

(57) ABSTRACT

A method of operating a rendering platform comprises receiving a rendering fragment at a rendering engine, passing an instruction from a rendering fragment to a callback component, and making a procedure call from the callback component to an external application according to the instruction. The method preferably includes registering one or more rendering devices on the rendering engine, and registering the callback component on the rendering engine as a rendering device.

22 Claims, 3 Drawing Sheets

(56) References Cited

OTHER PUBLICATIONS

Chester: "Cross-Platform Integration With XML and Soap"; IT Pro, Sep./Oct. 2001, IEEE, pp. 26-34.

Fox et al: "New Systems Technologies and Software Products for HPCC: vol. III-High Performance Commodity Computing on the Pragmatic Obect Web"; Technology Report for RCI Ltd., Oct. 1998, pp. 1-90.

Park et al: "Corba-Based Distributed and Replicated Resource Repository Architecture for Hierarchically Configuable Home Network"; Journal of Systems Architecture 51, 2005, pp. 125-142.

Osterlund: "Component Technology"; IEEE Computer Applications in Power, 2000, pp. 1-10.

Ponzo et al: "Integrating Web Technologies in Eclipse"; IBM Systems Journal, Vol. 44, No. 2, 2005, pp. 279-288.

Duke et al:"A Standard for Multimedia Middleware"; ACM Multimedia 1998, Bristol, UK, pp. 381-390.

Poltavets et al: "IEEE1394 to UPnP Software Bridge Structure"; IEEE 2005, pp. 375-376.

Ciancarini et al: "An Extensible Rendering Engine for XML and HTML"; Computer Networks and ISDN Systems 30 (1998), pp. 225-237.

Moreira et al"Middleware—The Layer in Between"; 19 page Paper, Supported by FCT (Programme Pocti-III EU Communitary Supporting Framework).

* cited by examiner

Method of operating a rendering platform to render events of an interactive media-presentation that span multiple devices in a media-enhanced environment.

Receive a rendering fragment at a rendering engine of a rendering platform, the rendering fragment including an XML document, the XML document identifying to the rendering engine (i) a device asset of the rendering platform and (ii) a value attribute for the device asset.

↓

Pass an instruction from the rendering fragment to a callback component device within the rendering platform, via the rendering engine in response to a triggering event, wherein the instruction comprises (i) the value attribute identified within the XML document and (ii) the callback component device that corresponds to the device asset identified within the XML document.

↓

Make a procedure call, via the callback component device, from the callback component device to an external application device according to the instruction without the procedure call passing through the rendering engine, the external application device (i) being external to the rendering platform and (ii) having implemented a remote procedure call interface to allow the callback component device to invoke the procedure call,
   wherein the instruction from the rendering fragment passed to the callback component device further comprises the procedure call.

↓

Register one or more rendering devices on the rendering engine via one or more XML documents for registering respective rendering devices,
   wherein the registering of a rendering device or a registering of the callback component device on the rendering engine comprises receiving at the rendering engine a respective XML document for registering a respective rendering device or callback component device on the rendering engine,
   wherein the registering of the callback component device comprises receiving, at the rendering engine, the XML document for registering the callback component device from the external application device.

↓

Register the callback component device on the rendering engine via an XML document for registering the callback component device,
   wherein the callback component device is registered on the rendering engine as a rendering device.

FIG. 3

DATA PROCESSING SYSTEM AND A METHOD OF OPERATING A RENDERING PLATFORM

This invention relates to a method of operating a rendering platform and to a data processing system that includes a rendering platform. The invention supports the calling of external services by means of rendering assets.

Today distributed rendering platforms such as described in WO 02/092183 allow authors to define interactive media presentations that span multiple input/output devices, such as lamps, fans, displays etc. The rendering platform renders "events", and there is often an event mechanism present that allows the rendering platform to render external events, for example, from a device by means of the 'event' language element in the specification defining the platform. However, it is not possible for third-party applications to react to an event triggered by the distributed media presentation engine. One possible solution to this problem is to expose the inner state of the rendering platform to the third-party application, but this is often not desired in view of security.

Third-party applications can add documents (sometimes referred to as fragments) that contain events and thereby have a means to affect the state of the rendering platform but the communication is only in one direction, from the third-party application to the rendering platform. Therefore it is impossible for third-party applications to react to changes in the state of the rendering platform. The application could try to keep a consistent copy of the state of the rendering platform, but this is not desirable, especially in highly distributed environments where there could be many of such applications active. As a result, applications can only 'guess' when to add or retract documents from the rendering platform. This implies that the rendering platform can only be used for relatively static distributed media presentations that involve only a limited form of interaction with end-users or third-party agents. The functionality that can be offered by the rendering platform and associated language is limited. For more complex rendering operations, for example three-dimensional manipulation on three-dimensional objects, most hypermedia markup languages are inadequate.

It is therefore an object of the invention to improve upon the known art.

According to a first aspect of the present invention, there is provided a method of operating a rendering platform comprising receiving a rendering fragment at a rendering engine, passing an instruction from a rendering fragment to a callback component, and making a procedure call from the callback component to an external application according to the instruction.

According to a second aspect of the present invention, there is provided a data processing system comprising a rendering engine, one or more rendering devices, a callback component, and an external application, the rendering engine arranged to receive rendering fragments and to pass an instruction from a rendering fragment to the callback component, and the callback component arranged to make a procedure call to the external application according to the instruction.

According to a third aspect of the present invention, there is provided a computer program product on a computer readable medium for operating a rendering platform and comprising instructions for receiving a rendering fragment at a rendering engine, passing an instruction from a rendering fragment to a callback component, and making a procedure call from the callback component to an external application according to the instruction.

Owing to the invention, it is possible to operate a rendering platform in such a way that an external application can be called from a component within the rendering platform, but without that procedure call passing through the rendering engine. The command for the procedure call, the instruction passed to the callback component, is passed through the rendering engine, however the rendering engine does not look at the contents of the instruction, but treats it as a string value and forwards it to the appropriate callback component. The benefits of this invention include the fact that it is highly generic, in that it will work with any type of application because a specific callback component can be written for each application. A more generic callback component (based on the SOAP protocol for example) is also possible, which does not require modification of the rendering platform. All that is required is a callback component to be implemented, and the internals of the rendering platform are not exposed.

The invention provides the solution to the problem of accessing an external application in two parts. Firstly, there is implemented a rendering device that implements a callback mechanism for the third-party application. Second, a procedure call as a media asset/item in the presentation language is submitted to the rendering engine.

Advantageously, the method further comprises registering one or more rendering devices on the rendering engine, and registering the callback component on the rendering engine. Preferably, the callback component is registered on the rendering engine as a rendering device. By registering the callback component as if it were a rendering device in the rendering platform, the rendering engine will always address the callback component as a rendering device and no amendment to the operation of the rendering engine is required.

Preferably, the registering of a rendering device or the callback component comprises receiving an XML document, and the registering of the callback component comprises receiving an XML document from the external application. Ideally, the instruction from the rendering fragment passed to the callback component comprises the procedure call.

Embodiments of the present invention will now be described, by way of example only, with reference to the accompanying drawings, in which:

FIG. 3 is a flow diagram of a method of operating a rendering platform to render events of an interactive media-presentation that span multiple devices in a media-enhanced environment, according to embodiments of the present disclosure.

Figure 1:
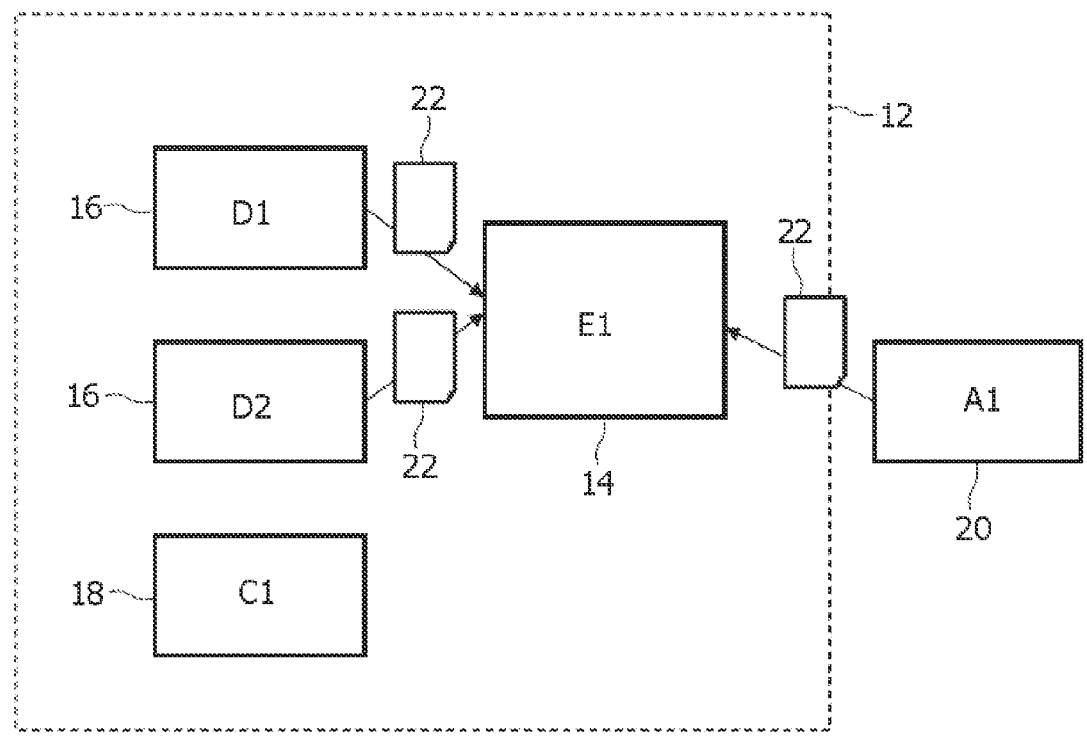
FIG. 1 is a schematic diagram of a data processing system.
Figure 2:
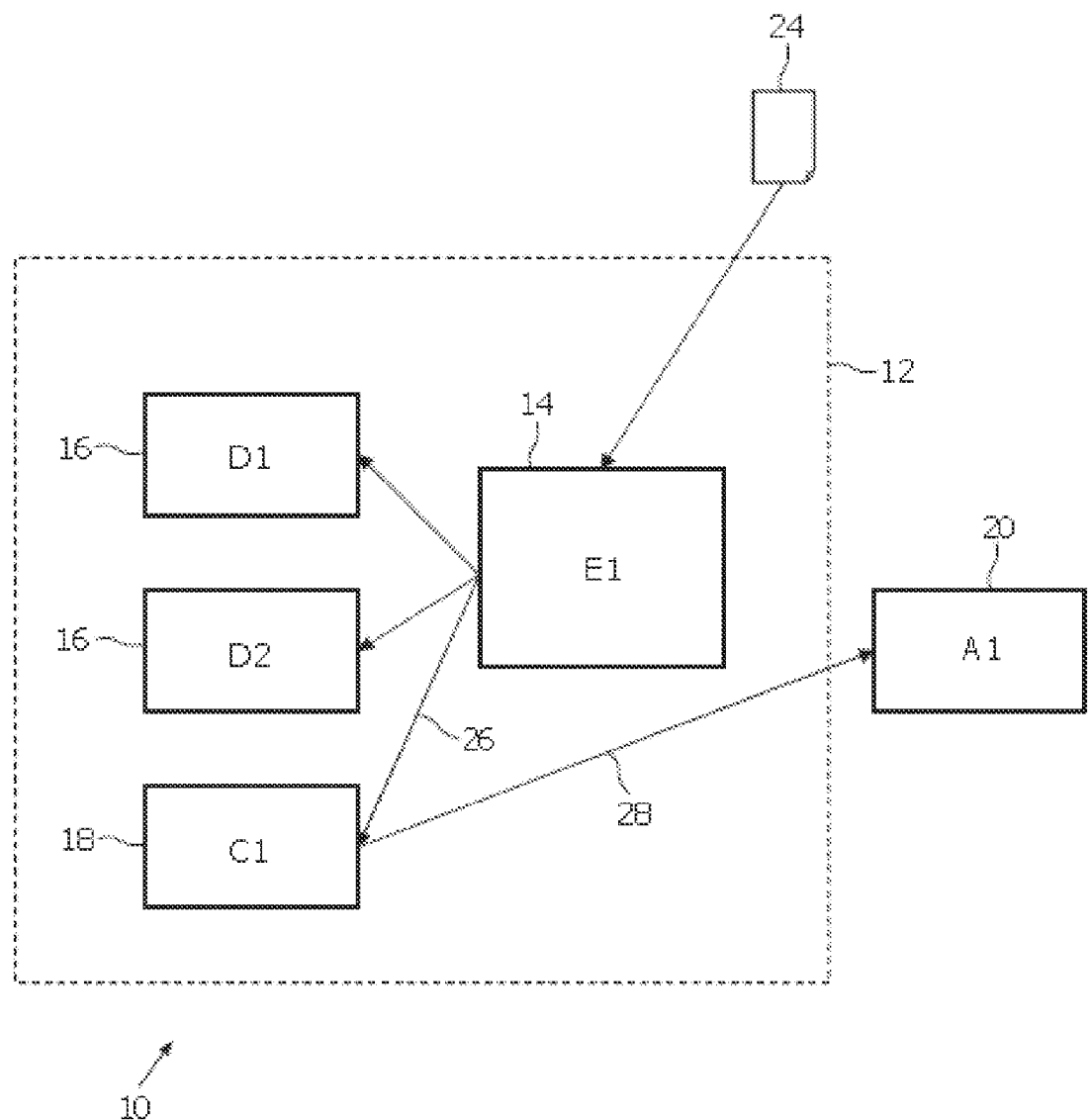
FIG. 2 is a further schematic diagram of the data processing system of FIG. 1.

FIGS. 1 and 2 show a data processing system 10, which comprises a rendering platform 12, which is comprised of a rendering engine 14, rendering devices 16 and a callback component 18. Included within the system 10 is an application 20, which is external to the rendering platform 12. In FIG. 1, the rendering devices 16 and callback component 18 are being registered with the rendering engine 14, by means of XML documents 22 being provided to the rendering engine 14.

To register itself as a new device, the callback component 18 must register with the rendering engine 14. This is achieved by sending a document 22 to the rendering engine 14 that describes the capability of the callback component 18 and its location. The document 22 registering the callback component 18 originates with the third-party application 20, and this is the methodology by which the external application 20 can be called from the rendering platform 12.

The code fragment below is an example of the contents of the document 22. The format and syntax of the document 22 will depend upon the details of the rendering platform 12.

```
<pml>
<fragment>
<device> callback
    <capability>
<type> external_application </type>
    </capability>
    <location> ANYWHERE </location>
</device>
</fragment>
</pml>
```

The rendering engine 14 will interpret this document 22 as the registration of a new device named callback with a capability to call procedures on an external application (type external_application). The device can be in any location (ANYWHERE). Once the device is registered with the rendering engine 14 it can be used. By rendering itself as a device, the callback component 18 is treated by the rendering engine 14 as if it were any other device in the platform.

The rendering engine 14 will receive rendering fragments (such as document 24 in FIG. 2), which are then distributed in whole or part to the rendering devices 16 and the callback component 18. The callback component 18 is effectively a special type of rendering device. Instead of rendering text, audio, or some other modality, it calls procedures on the third-party application 20 when instructed to by the rendering engine 14. If all of the traditional rendering devices (light, sound, video etc.) are removed, then the rendering engine 14 can use the callback component 18 alone and can composes generic software applications. The rendering engine 14 keeps track of the internal state and, via the callback component 18, calls program procedures. The rendering engine 14 using the callback component 18 can be implemented in the following manner.

Rendering engine 14 receives the description 24 (typically an XML document) from a source, which could be the third-party application 20, which tells the engine 14 what should be rendered. The description 24 can be a fragment for a specific rendering engine or an HTML document for an HTML browser. The rendering engine 14 reads the description and gives instructions to the rendering devices 16 (for example, play or stop a media item). The code fragment below shows an example of a presentation description in a markup language suitable for use in the system of WO 02/092183.

```
<pml>
<fragment>
<asset> asset1
    <state> red </state>
    <type> rgb_light </type>
    <value> 80, 0, 0 </value>
    <shareable> YES </shareable>
</asset>
</fragment>
</pml>
```

If this fragment is added to the pool of fragments in the rendering engine 14 then the following will happen. If the state red is active in the rendering engine 14 and there are one or more devices 16 available of type rgb_light then the value 80, 0, 0 will be sent to those device(s) 16 (provided that each device has the same location attribute value as defined for the state/object red).

In a similar fashion, the third-party application 20 can now be called if a certain state becomes true. The fragment 24 may include the following XML:

```
<pml>
<fragment>
<asset> hello
    <state> red </state>
    <type> external_application </type>
    <value> printHello </value>
    <shareable> YES </shareable>
</asset>
</fragment>
</pml>
```

If this fragment 24 (which may be from the third-party application 20) is added to the rendering engine 14, then the instruction 26 printHello within the document 24 will be passed to the callback component 18. The callback component 18 will make a procedure call 28 to the third-party application 20 when the state red becomes true in the rendering engine 14. The callback component 18 implements how the third-party application 20 will be called, the rendering engine 14 only knows that a 'media asset' hello must be 'rendered' with value printHello. The third-party application 20 must have implemented a remote procedure call interface to allow callback components to invoke procedure calls otherwise all external (remote) procedure calls will fail.

In summary, the document 24 with an asset description of type external_application is sent to the engine 14. The engine 14 recognizes the asset type (a device named callback registered itself with this capability before) and sends the command string printHello in the value attribute when the state becomes red to the device. The component 18 invokes the printHello procedure on a third-party application 20 (locally or remote). Note that the command string may contain a complete (remote) procedure call description (e.g. in SOAP) so that the callback component 18 can be made more generic.

The approach illustrated above can also be applied to many other declarative presentation languages since many presentation languages make a distinction between device descriptions and media element descriptions. In SMIL (W3C standard for multimedia on the Web) for example, the layout section exists to specify (screen) devices and (screen) regions on devices. Language elements such as audio, video and image can be used in the main section to specify audio, video or image media items respectively. These media elements must always be associated to a region and therefore, indirectly, always link to a device. Therefore, a callback component as discussed above can be specified in the layout section and used in the main section.

The invention applies to media-enhanced environments designed to support everyday life performances (ambient intelligent environments) and context-aware systems in general.

The invention claimed is:

1. A method of operating a rendering platform to render events of an interactive media-presentation that span multiple devices in a media-enhanced environment, comprising:
    receiving a rendering fragment at a rendering engine, of the rendering platform, the rendering fragment including an XML document, the XML document identifying to the rendering engine (i) a device asset of the rendering platform and (ii) a value attribute for the device asset;
    passing an instruction from the rendering fragment to a callback component, device within the rendering platform, via the rendering engine in response to a triggering event, wherein the instruction comprises (i) the value attribute identified within the XML document and (ii) the callback component device that corresponds to the device asset identified within the XML document; and making a procedure call, via the callback component device, from the callback component device to an external application device according to the instruction without the procedure call passing through the rendering engine, the external application device (i) being external to the rendering platform and (ii) having implemented a remote procedure call interface to allow the callback component device to invoke the procedure call.

2. The method according to claim 1, further comprising: registering one or more rendering devices on the rendering engine via one or more XML documents for registering respective rendering devices.

3. The method according to claim 1, further comprising: registering the callback component device on the rendering engine via an XML document for registering the callback component device.

4. The method according to claim 3, wherein the callback component device is registered on the rendering engine as a rendering device.

5. The method according to claim 2, wherein the registering of a rendering device or a registering of the callback component device on the rendering engine comprises receiving at the rendering engine a respective XML document for registering a respective rendering device or callback component device on the rendering engine.

6. The method according to claim 5, wherein the registering of the callback component device comprises receiving, at the rendering engine, the XML document for registering the callback component device from the external application device.

7. The method according to claim 1, wherein the instruction from the rendering fragment passed to the callback component device further comprises the procedure call.

8. A data processing system embodying a rendering platform to render events of an interactive media-presentation that span multiple devices in a media-enhanced environment, comprising:

a rendering engine, of the rendering platform;

one or more rendering devices within the rendering platform;

a callback component device within the rendering platform; and an external application device, wherein the external application device (i) is external to the rendering platform and (ii) has implemented a remote procedure call interface to allow the callback component device to invoke a procedure call, wherein the rendering engine (I) receives rendering fragments, the rendering fragments including XML documents, each XML document identifying to the rendering engine (i) a device asset of the rendering platform and (ii) a value attribute for the device asset and (II) passes, in response to a triggering event, an instruction from a rendering fragment to the callback component device, wherein the instruction comprises (i) the value attribute identified within the XML document of the corresponding rendering fragment and (ii) the callback component device that corresponds to the device asset identified within the XML document of the corresponding rendering fragment, and wherein the callback component arranged to make a device makes the procedure call to the external application device according to the instruction without the procedure call passing through the rendering engine.

9. The system according to claim 8, wherein the rendering engine, the one or more rendering devices and the callback component device comprise the rendering platform.

10. The system according to claim 8, wherein the one or more rendering devices are registered on the rendering engine.

11. The system according to claim 8, wherein the callback component device is registered on the rendering engine.

12. The system according to claim 11, wherein the callback component device is registered on the rendering engine as a rendering device.

13. The system according to claim 10, wherein the registering of a rendering device or a registering of the callback component device comprises receiving at the rendering engine a respective XML document for registering a respective rendering device or callback component device on the rendering engine.

14. The system according to claim 13, wherein the registering of the callback component device comprises receiving, at the rendering engine, the XML document for registering the callback component device from the external application device.

15. The system according to claim 9, wherein the instruction from the rendering fragment passed to the callback component device further comprises the procedure call.

16. A non-transitory computer readable medium embodied with a computer program for operating a rendering platform to render events of an interactive media-presentation that span multiple devices in a media-enhanced environment, comprising instructions for:

receiving a rendering fragment at a rendering engine, of the rendering platform, the rendering fragment including an XML document, the XML document identifying to the rendering engine (i) a device asset of the rendering platform and (ii) a value attribute for the device asset;

passing an instruction from the rendering fragment to a callback component, device within the rendering platform, via the rendering engine in response to a triggering event, wherein the instruction comprises (i) the value attribute identified within the XML document and (ii) the callback component device that corresponds to the device asset identified within the XML document; and making a procedure call, via the callback component device, from the callback component device to an external application device according to the instruction without the procedure call passing through the rendering engine, the external application device (i) being external to the rendering platform and (ii) having implemented a remote procedure call interface to allow the callback component device to invoke the procedure call.

17. The non-transitory computer readable medium according to claim 16, further comprising instructions for:

registering one or more rendering devices on the rendering engine via one or more XML documents for registering respective rendering devices.

18. The non-transitory computer readable medium according to claim 16, further comprising instructions for:

registering the callback component device on the rendering engine via an XML document for registering the callback component device.

19. The non-transitory computer readable medium according to claim 18, wherein the callback component device is registered on the rendering engine as a rendering device.

20. The non-transitory computer readable medium according to claim 17, wherein the registering of a rendering device or a registering of the callback component device comprises receiving at the rendering engine a respective XML document for registering a respective rendering device or callback component device on the rendering engine.

21. The non-transitory computer readable medium according to claim 20, wherein the registering of the callback component device comprises receiving, at the rendering engine, the XML document for registering the callback component device from the external application device.

22. The non-transitory computer readable medium according to claim 16, wherein the instruction from the rendering fragment passed to the callback component device further comprises the procedure call.

\* \* \* \* \*